United States Patent
Schultz et al.

(10) Patent No.: US 8,694,262 B2
(45) Date of Patent: Apr. 8, 2014

(54) SYSTEM AND METHOD FOR SUBSURFACE CHARACTERIZATION INCLUDING UNCERTAINTY ESTIMATION

(75) Inventors: Philip Stephan Schultz, Bellaire, TX (US); Cory James Hoelting, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 358 days.

(21) Appl. No.: 13/210,269

(22) Filed: Aug. 15, 2011

(65) Prior Publication Data

US 2013/0046476 A1 Feb. 21, 2013

(51) Int. Cl.
*G06F 19/00* (2011.01)
*G01V 1/28* (2006.01)
*G01V 1/30* (2006.01)

(52) U.S. Cl.
CPC ............... *G01V 1/301* (2013.01); *G01V 1/305* (2013.01); *G01V 2210/667* (2013.01); *G01V 2210/6222* (2013.01)
USPC .................. 702/18; 367/53; 702/14; 707/205

(58) Field of Classification Search
CPC ....... G01V 1/301; G01V 1/303; G01V 1/305; G01V 2210/63; G01V 2210/641; G01V 2210/66; G01V 2210/667; G01V 2210/6222; G01V 1/30; G01V 1/32; G01V 1/50; Y10S 707/99942; Y10S 707/99953
USPC ............ 702/6, 11, 13, 14, 16, 18; 367/38, 41, 367/53, 73; 703/2, 6; 707/10, 101, 203, 205
See application file for complete search history.

(56) References Cited

U.S. PATENT DOCUMENTS

| | | | |
|---|---|---|---|
| 7,206,782 B1 * | 4/2007 | Padgett | 1/1 |
| 2009/0184958 A1 | 7/2009 | Osypov et al. | |
| 2009/0303834 A1 | 12/2009 | Sengupta et al. | |
| 2010/0149917 A1 * | 6/2010 | Imhof et al. | 367/53 |
| 2010/0305865 A1 | 12/2010 | Bachrach et al. | |
| 2011/0098996 A1 | 4/2011 | Nichols et al. | |

* cited by examiner

*Primary Examiner* — John H Le
(74) *Attorney, Agent, or Firm* — Marie L. Clapp

(57) ABSTRACT

A system and method for subsurface characterization including depth and structural uncertainty estimation is disclosed. In one embodiment, the method may include determining a detectability threshold for moveout in a seismic data gather based on the seismic data and computing a depth uncertainty function, wherein the depth uncertainty function represents an error estimate that is used to analyze an interpretation of the seismic data. In another embodiment, the method may include receiving a depth uncertainty volume and at least one interpreted horizon from seismic data, extracting a depth uncertainty cage for each of the interpreted horizons based on the depth uncertainty volume, and simulating multiple realizations for each of the interpreted horizons, constrained by the depth uncertainty cage. The multiple realizations may be used for analyzing changes to geometrical or structural properties of the at least one interpreted horizon. The changes may be plotted as at least one distribution and may be used to make P10, P50 and P90 estimates.

18 Claims, 8 Drawing Sheets

SYSTEM AND METHOD FOR SUBSURFACE CHARACTERIZATION INCLUDING UNCERTAINTY ESTIMATION

FIELD OF THE INVENTION

The present invention relates generally to methods and systems for characterization of subsurface formations using seismic data and, in particular, methods and systems for subsurface characterization that estimate uncertainty in the depth or structure of the interpreted subsurface based on an anisotropic seismic velocity model.

BACKGROUND OF THE INVENTION

Oil and gas prospect evaluation and field development require accurate characterization of subsurface features. Seismic acquisition over subsurface structure generally produces time-domain data, which is then migrated to, for example, depth image data. The migration process necessarily involves certain assumptions regarding the propagation velocity of elastic waves through the subsurface materials and structures. Moreover, there is generally some degree of anisotropy in geological formations. That is, while it may be possible to determine vertical velocities using well data, the velocities estimated using multi-offset seismic techniques will necessarily be somewhat different from measured vertical velocities. Finally, because assumptions, based on measurement or estimation, regarding both velocities and degrees of anisotropy may be incorrect, there is some inherent uncertainty in the resulting depth image, both in the depth of imaged events and in the structural interpretation of the events.

Models of the subsurface obtained from geophysical measurements are inherently non-unique. Geophysical measurements are finite in resolution, and relate to many orders of magnitude of scale. Uncertainty in the measurements results from a variety of sources, including signal-to-noise ratio, data acquisition parameter selection, processing algorithms, or the above mentioned velocity and anisotropy parameter selection. It is therefore important to understand the degree of that uncertainty when evaluating model results. That is, it is important to quantitatively understand to what degree the models are sensitive to a given change or group of changes in the assumptions regarding velocities, anisotropy or the other factors impacting uncertainty. An understanding of the uncertainty and the range of possible characterizations allows interpreters of the data to make business decisions regarding reserve estimation, well placement and count, development scenarios, secondary recovery strategies and other factors that ultimately impact recovery and project economics.

SUMMARY OF THE INVENTION

Described herein are implementations of various approaches for a computer-implemented method for subsurface characterization from seismic data. In one embodiment, the method may include receiving effective parameters and properties from an anisotropic seismic velocity model, at least one velocity function, and key descriptors from seismic data; determining a detectability threshold for moveout in a seismic data gather based on the seismic data; and computing a depth uncertainty function based on the detectability threshold, the effective parameters and properties, and the at least one velocity function, wherein the depth uncertainty function represents an error estimate that is used to analyze an interpretation of the seismic data.

In another embodiment, the computer-implemented method may include receiving a depth uncertainty volume and at least one interpreted horizon from seismic data; extracting a depth uncertainty cage for each of the at least one interpreted horizons based on the depth uncertainty volume; and simulating multiple realizations for each of the at least one interpreted horizons, constrained by the depth uncertainty cage. The multiple realizations may be used for analyzing changes to geometrical or structural properties of the at least one interpreted horizon. The changes may be plotted as at least one distribution and may be used to make P10, P50 and P90 estimates.

Additional embodiments include systems and articles of manufacture configured to implement the methods described herein.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, claims and accompanying drawings where:

DETAILED DESCRIPTION OF THE INVENTION

Figure 1:
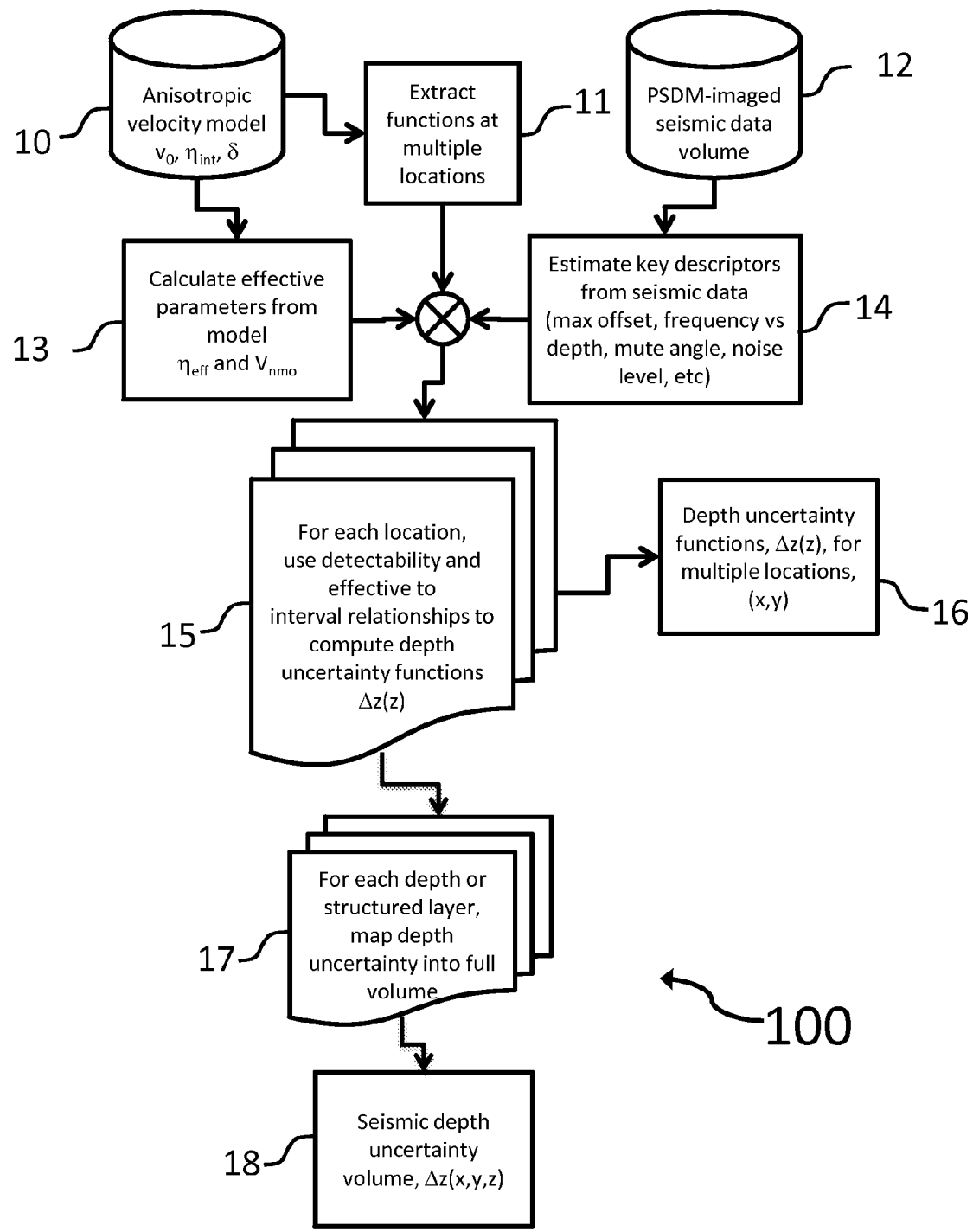
FIG. 1 is a flowchart illustrating a method in accordance with an embodiment of the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple processor computers, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices. The present invention may also be practiced as part of a down-hole sensor or measuring device or as part of a laboratory measuring device.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including, for example, as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to characterizing the subsurface using seismic data by estimating uncertainty in depth or structure based on the uncertainty in the heterogeneous and/or anisotropic velocity model. For the purposes of this description, the term, velocity, refers specifically to propagation velocity of the acoustic wave energy, or p-waves. The present analysis, however, can be applied with equal validity to shear wave energy, or s-waves. In this document, anisotropic velocity refers both to anisotropy and heterogeneity. The uncertainty in the anisotropic velocity model arises from the limit of velocity resolution based on detectability of a small perturbation in the curvature of the arrival time versus source-receiver offset or angle, commonly called moveout.

The process of transforming or migrating acquired seismic data in the time domain to the depth domain uses a velocity model. Often, each volume of similar source-receiver offset traces in a seismic survey are migrated together. The volumes of different source-receiver offsets can then be re-sorted to show the continuum of source-receiver offset traces at each output location in the migrated seismic data. In evaluating the velocity model used in a migration, one factor that can be applied to verify that the resulting model is accurate is the existence of flat gathers. That is, the response due to a particular seismic reflector is indicated at the same depth across all source-receiver offsets at the same seismic trace location, indicating no moveout. It should be noted that the method described herein is not limited to offset-domain common image gathers, but may find application in subsurface angle and subsurface angle plus azimuth gathers, offset-domain plus azimuth, and other gather methods.

Since it is true that a perfect velocity model would produce flat gathers, it is generally assumed that flat gathers imply that the anisotropic velocity model is correct. However, in practice the production of flat gathers does not necessarily imply that the model is perfect, because it is possible that the perturbation in the moveout is not detectable due to the noise inherent in the data, the finite source-receiver offset ranges, and the width of the seismic wavelets. In other words, flat gathers are a necessary but insufficient condition for an accurate velocity model. Furthermore, for a given set of data, there are likely different velocity models that all produce apparently flat gathers but would also yield different realizations for the subsurface structure. The resulting differences in structure may be such that a hydrocarbon reservoir appears to be larger or smaller and that the target interval for a selected well location can vary in depth. Both factors can result in improper selection of well locations and drill depths impacting the ultimate productivity and economic value of the reservoir.

The discussion above implies that the seismic data be processed with a prestack depth migration algorithm. However, those experienced in the art would realize that the seismic data could also be processed with a poststack depth migration algorithm. Although a poststack depth migration is known not to be as accurate as a prestack depth migration, certain features of this invention could be employed using an algorithm of either type. The use of a poststack depth migration algorithm in this invention precludes the analysis of migrated offset (or azimuth) versus depth gathers; however, there are other methodologies, such as image coherence, to judge the range of acceptable solutions in order to practice this invention.

To fully characterize the velocity field for a given subsurface volume of interest, the velocity data may need to be known in a variety of directions. The common terminology used includes $v_o$ to indicate the vertical velocity (the seismic velocity vertically in the Earth), $v_{nmo}$ to indicate the near offset moveout velocity of the seismic energy traveling in the Earth, $\eta$ to represent a difference between the horizontal velocity of the seismic energy in the Earth and $v_{nmo}$, $\delta$ to represent a difference between the vertical velocity of the seismic energy in the Earth and $v_{nmo}$, and $\epsilon$ to represent a difference between the vertical and horizontal velocities of the seismic energy in the Earth. The parameters which represent anisotropy, $\eta$, $\delta$, and $\epsilon$, are known to those skilled in the art. Further, those experienced in the art will appreciate that if the symmetry axis of the velocity in the Earth is not vertical, but rather tilted at arbitrary dip and strike angles, the velocity along the symmetry axis may be substituted for the vertical velocity in the above description. The velocity orthogonal to the symmetry axis would then be substituted for the horizontal velocity in the above description.

FIG. 1 is a flowchart illustrating a method 100 of the present invention that uses the detectability criterion to determine depth uncertainty from seismic data and an anisotropic velocity model. This embodiment may begin, for example, with an anisotropic velocity model 10, which may have been obtained from well log data, well core data, seismic data or some other data, and a PSDM seismic data volume 12, which may have been migrated by wave-equation methods, Kirchhoff type methods, or some other migration method. The seismic data might also be poststack migration data and might be 2D or 3D.

Using the anisotropic velocity model, this embodiment of the present invention extracts functions at multiple spatial locations at step 11, where the locations are commonly identified in terms of x in the 2D case or (x,y) in the 3D case. The functions that may be extracted are, for example, depth functions of the $v_o$ (vertical velocity), $\eta_{int}$ (interval $\eta$), and $\delta$, which is also an interval function. One skilled in the art will appreciate that these functions might also be obtained in other ways, such as from regional geologic models, and that they might also be constants, i.e. have the same value for all depths.

The anisotropic velocity model may also be used to calculate so-called effective parameters and properties at step 13. These parameters and properties may include $\eta_{\it eff}$, which is the effective $\eta$, $v_{nmo}$, which is the interval NMO velocity, and $V_{nmo}$, which is the effective NMO velocity. All three of these parameters may vary in three dimensions.

The parameters $\eta_{\it eff}$ and $V_{nmo}$ describe the moveout of a given seismic event as a composite effect of the overlying layers, and can be written in the form:

$$t_h^2 = t_0^2 + \frac{X^2}{V_{nmo}^2} - \frac{2\eta_{\it eff} X^4}{V_{nmo}^2[t_0^2 V_{nmo}^2 + (1+2\eta_{\it eff})X^2]} \quad \text{Eqn. 1}$$

where $t_o$ is the zero-offset intercept time, X is the offset, and $t_h$ is the arrival time at that offset. This equation may be called the anisotropic moveout equation. One skilled in the art will appreciate that it is possible to determine a similar relationship for angle gathers.

The effective moveout velocity $V_{nmo}$, the interval moveout velocity $v_{nmo}$, and the vertical interval $v_o$ are related as:

$$v_{nmo}^2(t_2) = \frac{t_2 V_{nmo}^2(t_2) - t_1 V_{nmo}^2(t_1)}{t_2 - t_1} \quad \text{Eqn. 2}$$

$$v_{nmo} = v_0 \sqrt{1+2\delta} \quad \text{Eqn. 3}$$

Referring again to FIG. 1, at step 14 the seismic data is used to estimate key descriptors. These key descriptors are characteristics of the seismic data that can be easily estimated or determined by one skilled in the art. They may include, for example, the minimum and maximum offset, the angle mute, the highest usable frequency in the data at shallow depths and at the maximum depth, the maximum depth, and the general level of signal with respect to noise. Once these key descriptors are determined, the seismic data is not needed for the remainder of the method 100.

Figure 3:
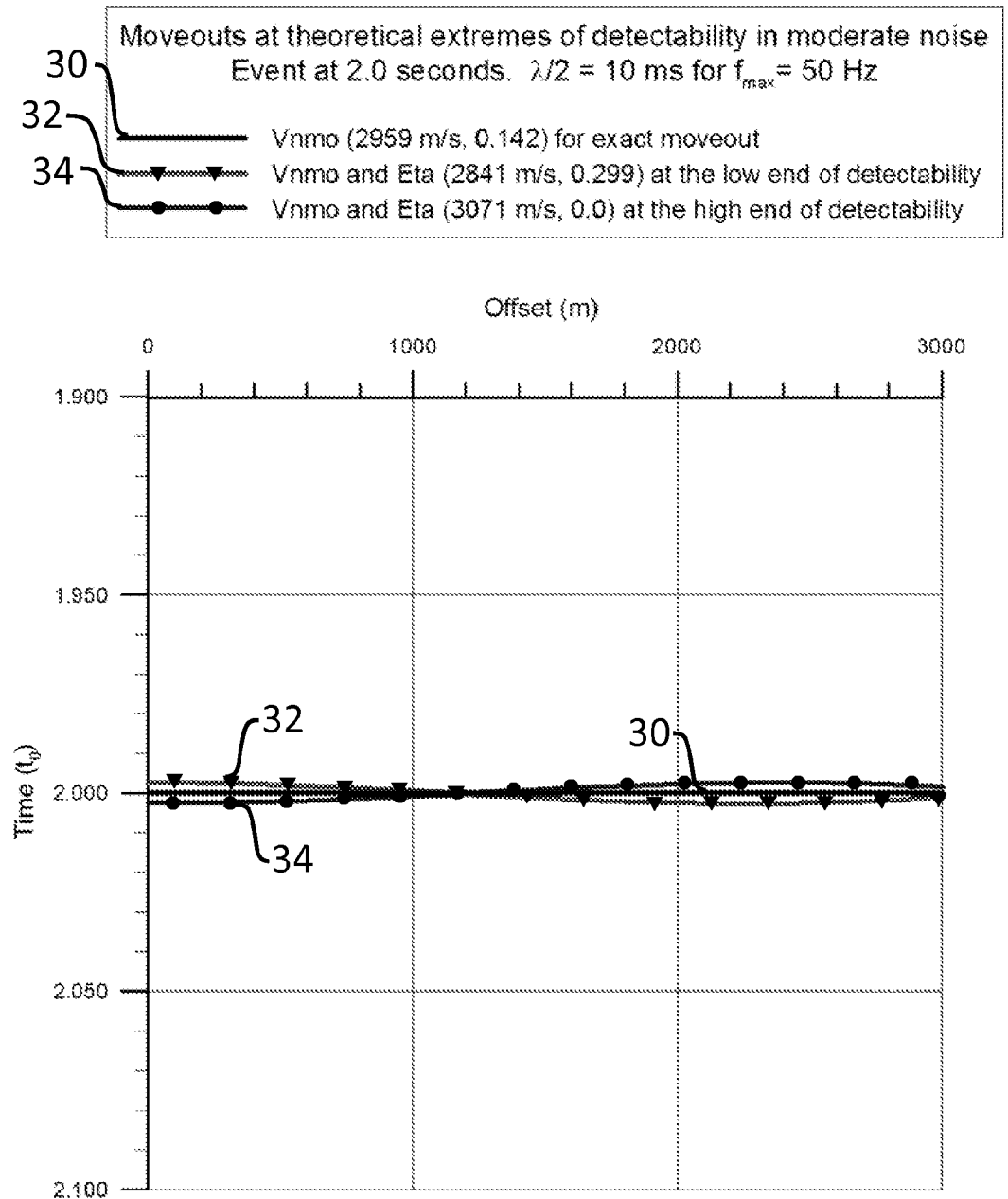
FIG. 3 illustrates exemplary moveout curves computed by a method in accordance with the present invention.
Figure 4:
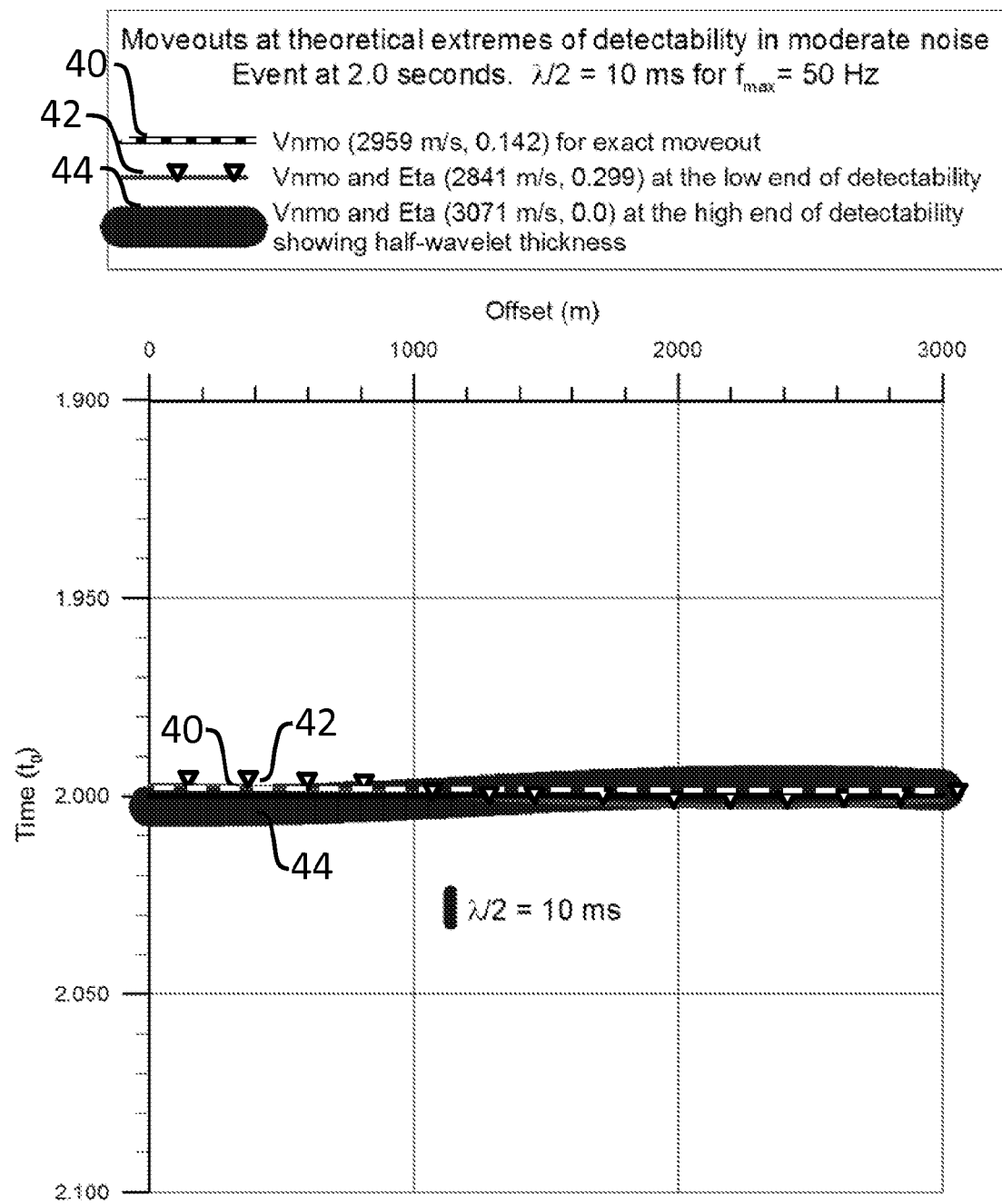
FIG. 4 illustrates exemplary moveout curves including wavelet thickness computed by a method in accordance with the present invention.
Figure 5:
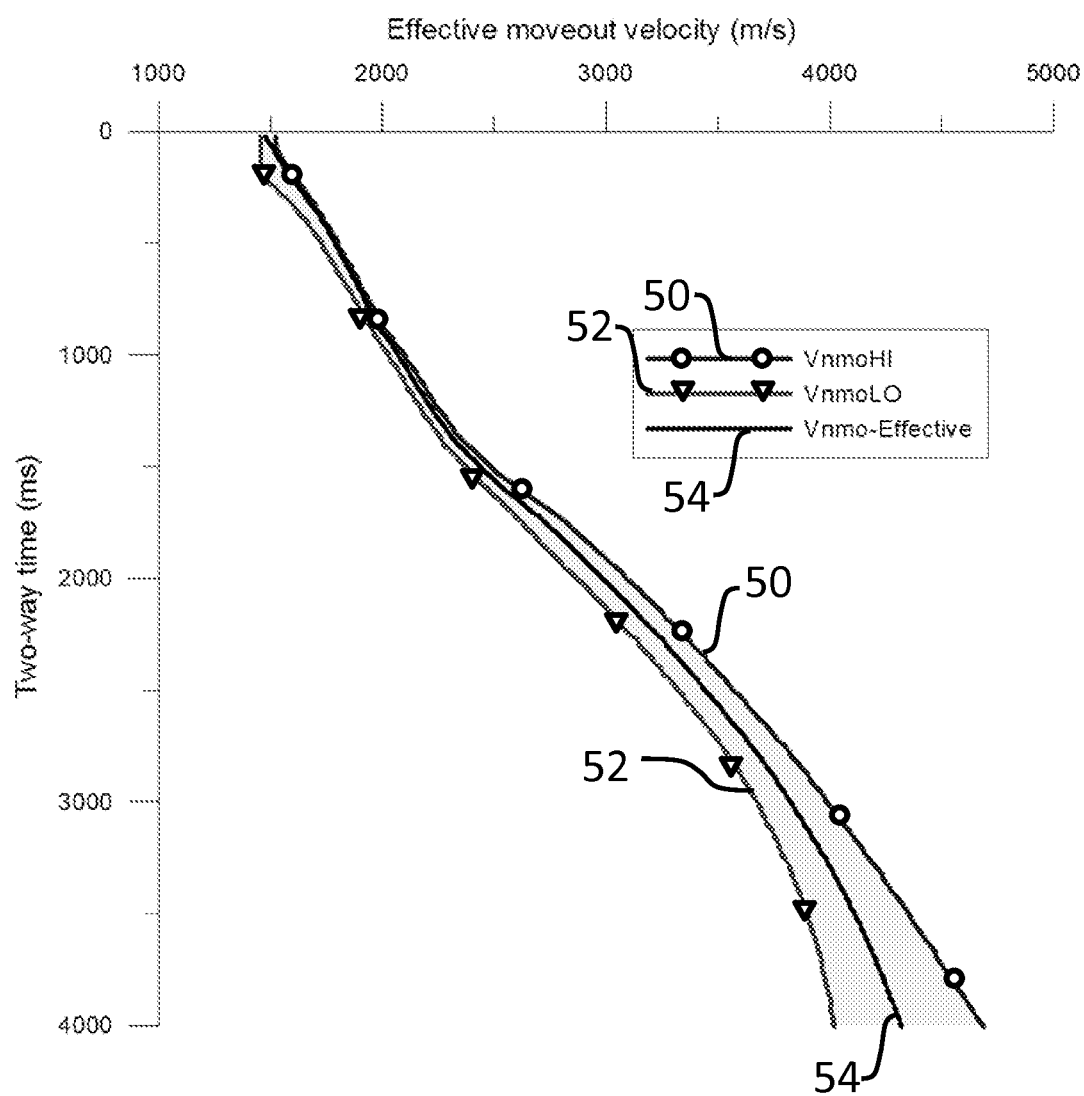
FIG. 5 illustrates exemplary velocity curves computed by a method in accordance with the present invention.

The parameters and properties from steps 11, 13, and 14 are passed to step 15 which computes depth uncertainty functions $\Delta z(z)$ for each spatial location. This computation uses the concept of detectability, which is a measure of whether non-flat moveout is detectable. The detectability computation produces bounding velocity and eta curves, ($V_{nmoLO}$, $\eta_{\it effLO}$) and ($V_{nmoHI}$, $\eta_{\it effHI}$). Examples of moveout curves generated at a single location (x,y) and arrival time $t_0$ from these bounding velocity and eta curves can be seen in FIGS. 3 and 4, where the curve 30 in FIG. 3 shows the exact moveout as completely flat, curve 32 shows the moveout at the low (LO) end of detectability, and curve 34 shows the moveout at the high (HI) end of detectability. FIG. 4 shows the same curves 40, 42, and 44 but has also thickened curve 44 to represent the half-wavelet thickness $\lambda/2$, which helps to illustrate why it is difficult to detect non-flat moveouts that fall within the bounds calculated by the detectability criteria. An example of the bounding $V_{nmo}$ curves in time can be seen in FIG. 5, where curve 54 represents the effective $V_{nmo}$ that produces a flat moveout curve such as curve 30 in FIG. 3, curve 50 represents the $V_{nmoHI}$ that would produce a moveout curve such as curve 34 in FIG. 3, and curve 52 represents the $V_{nmoLO}$ that would produce a moveout curve such as curve 32 in FIG. 3.

Referring again to FIG. 1, step 15 will use the bounding velocity and eta curves to compute the depth uncertainty functions $\Delta z(z)$. To do this, the effective properties represented by the bounding curves may first be converted into interval properties. This process can be described as:

$$v_{nmo} = f(V_{nmo}), \eta_{int} = g(v_{nmo}, \eta_{\it eff}), \text{ and } \delta = e(\eta_{int}) \quad \text{Eqn. 4}$$

where $f$, $g$, and $e$ are functions that convert the effective properties into interval properties.

For the function $f$ one option is to use a stabilized version of Eqn. 2, which is the Dix equation, applied to convert from effective moveout velocity, $V_{nmo}$, to interval moveout velocity, $v_{nmo}$. This example is not meant not be limiting; other velocity-conversion methods are within the scope of the present invention.

For the function g, one of several options is selected based on characteristics of the data set under consideration. These options may include using crossplots and curve fitting to derive a version of the relationship g that is specific to the current velocity model, using a relationship derived in a manner similar to the first option based on regional behavior observed and learned from estimation of multiple velocity models, or by stabilization of the generalized Dix-like relationship:

$$\eta_{int}(t_0, t_1) = \frac{\frac{\left(\int_0^{t_1} v_{nmo}^2 d\tau\right)^2}{t_1}(\eta_{\it eff}(t_1) - \eta_{iso}(t_1)) - \frac{\left(\int_0^{t_0} v_{nmo}^2 d\tau\right)^2}{t_0}(\eta_{\it eff}(t_0) - \eta_{iso}(t_0))}{\left(\int_{t_0}^{t_1} v_{nmo}^4 d\tau\right)} \quad \text{Eqn. 5}$$

where $$n_{iso}(t_1) = \frac{1}{8}\left[\frac{t_1 \int_0^{t_1} v_{nmo}^4 d\tau}{\left(\int_0^{t_1} v_{nmo}^2 d\tau\right)^2} - 1\right] \quad \text{Eqn. 6}$$

One skilled in the art may recognize other methods that may be used to derive g. These examples are not meant to be limiting.

For the function e, an empirical relationship may be used to derive $\delta$ from $\eta_{int}$. These types of relationships are commonly used in practice when well data is not incorporated into the anisotropic velocity estimation problem. A specific example of one of these empirical relationships is:

$$\delta = \frac{\eta_{int}}{3} \quad \text{Eqn. 7}$$

but other relationships may be used based on knowledge of the particular rock formations in the subsurface.

When $v_{nmo}$ and $\delta$ have been computed for the high and low bounds of detectability, the vertical velocities $v_{oLo}$ and $v_{oHI}$ can be computed using Eqn. 3. Note that $v_{oLo}$ and $v_{oHI}$ are functions of time $t_o$. The depth functions $z_{LO}(t_o)$ and $z_{HI}(t_o)$ may be computed from $v_{oLO}$ and $v_{oHI}$ by integrating over $t_o$ which allows all the bounding curves to be converted from time to depth. The resultant interval depth models $z_{LO}(z)$ and $z_{HI}(z)$ are functions of depth calculated from the input velocity model, not the depth as calculated from the bounding functions.

Once $z_{LO}(z)$ and $z_{HI}(z)$ are computed, the depth uncertainty as a function of depth $\Delta z(z)$ is computed by:

$$\Delta z(z) = z_{HI}(z) - z_{LO}(z).  \quad \text{Eqn. 8}$$

Figure 6:
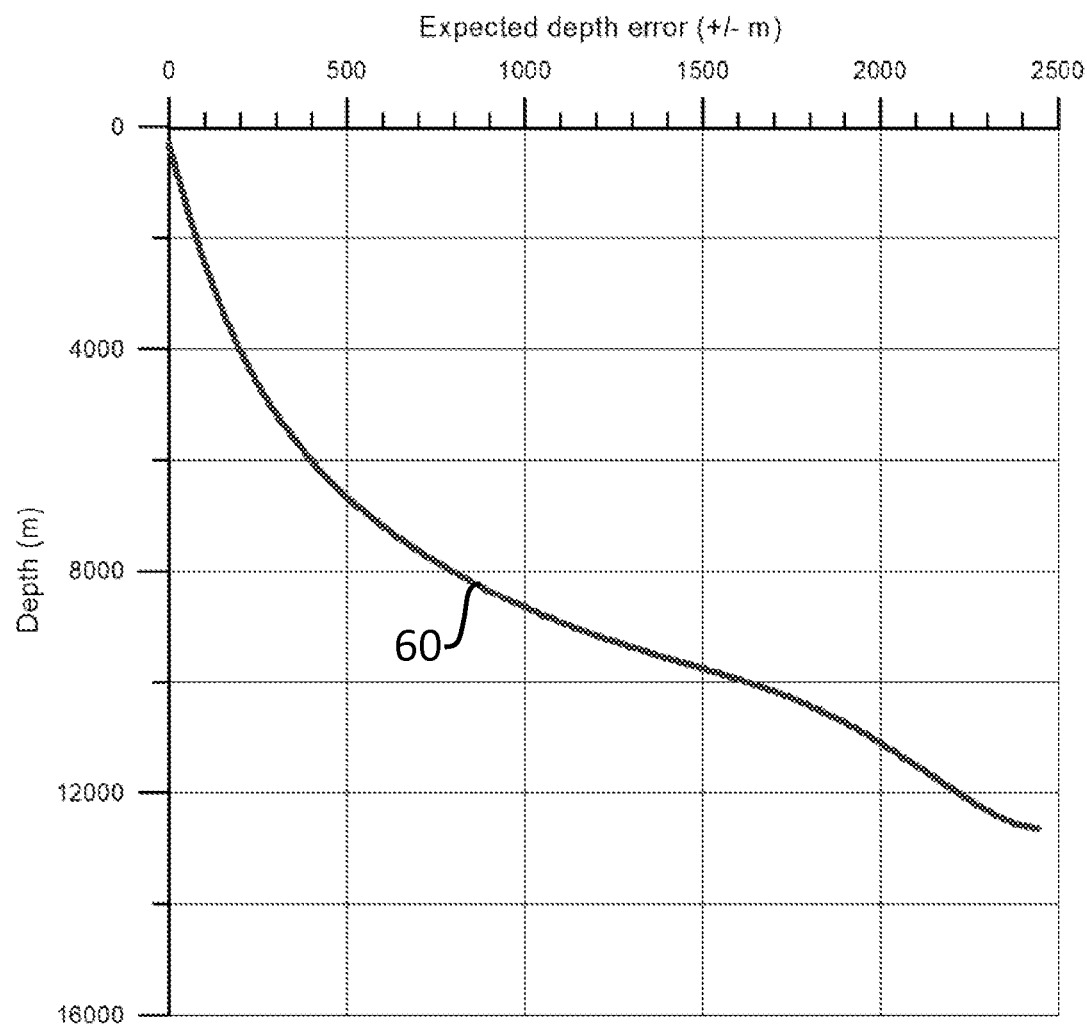
FIG. 6 illustrates an exemplary depth uncertainty curve computed by a method in accordance with the present invention.

The $\Delta z(z)$ for each spatial location may be output, either to a storage device or a display device, at step 16 of method 100. An example of a $\Delta z(z)$ for a single location can be seen as curve 60 in FIG. 6, which shows $\Delta z(z)/2$, the +/− error estimate. The $\Delta z(z)$ may also be mapped into a depth uncertainty volume, $\Delta z(x,y,z)$, at step 17 which is then output at step 18. The depth uncertainty volume gives an estimate of the depth uncertainty at any point in the volume from analysis of the seismic data alone. The depth uncertainty volume may be constructed by discrete depths or by using conformable structural layers.

The above analysis is described for a specific symmetry of anisotropy, the VTI medium. The analysis is equally valid for TTI ("Tilted, Transverse Isotropic") media, when equations suitable to TTI are substituted. In TTI media, the symmetry axis becomes distinct from the vertical axis, and the equations relating interval and effective properties are generalized to accommodate this distinction.

Figure 2:
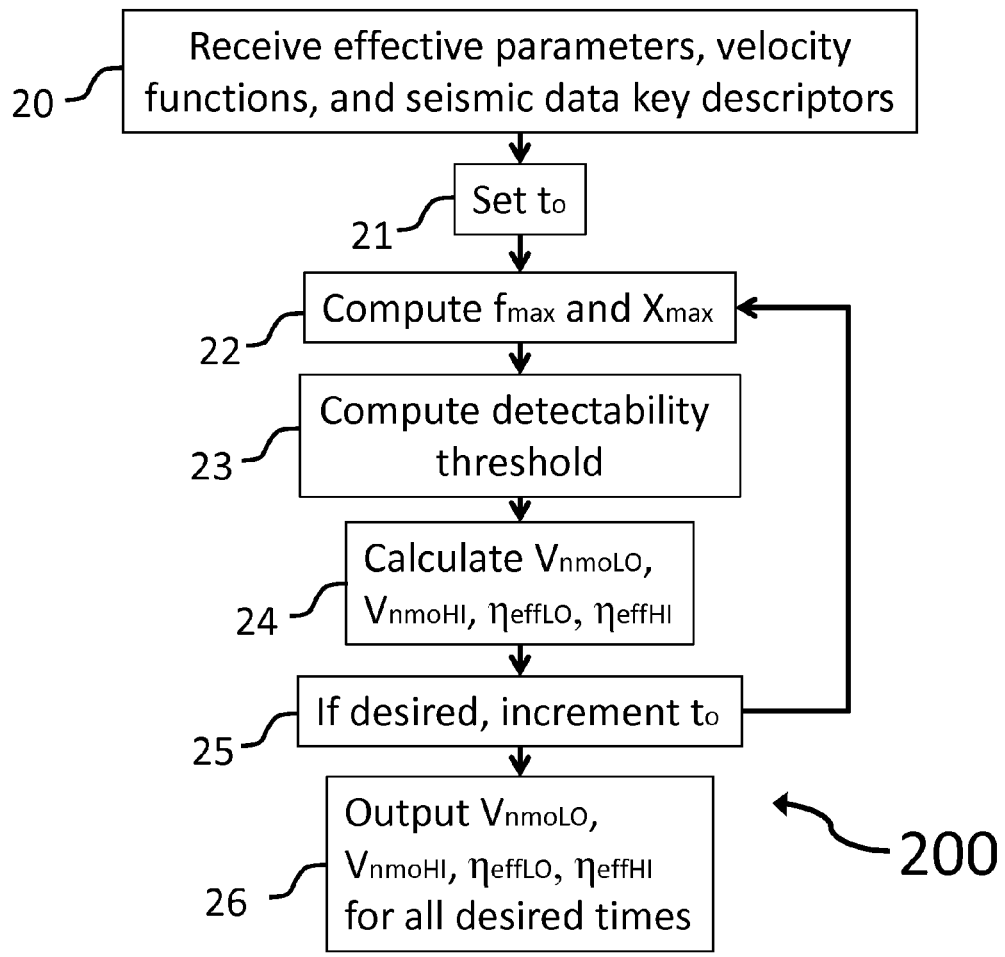
FIG. 2 is a flowchart illustrating a method for using detectability in accordance with an embodiment of the present invention.

The detectability computation to which step 15 of FIG. 1 refers is explained in FIG. 2 as method 200. This computation generates bounding velocity and eta curves, $(V_{nmoLO}, \eta_{effLO})$ and $(V_{nmoHI}, \eta_{effHI})$ for all desired zero-offset intercept times $t_o$ and each of the multiple spatial locations. In step 20, input is received. This input may include the effective parameters from step 13 of FIG. 1, the velocity functions from step 11 of FIG. 1, and the key descriptors from step 14 of FIG. 1. Method 200 then begins at the first desired $t_o$, set at step 21. For this $t_o$, the maximum usable frequency $f_{max}$ is computed based on the usable frequency information from the seismic data key descriptors. This may be done based on a linear trend computed from a $f_{max}$ determined for shallow depths and a $f_{max}$ determined for the maximum depth or may be selected from a $f_{max}$ function in time or depth that was supplied as a key descriptor. Step 21 also computes the $X_{max}$ maximum offset within the angle mute at this $t_o$ or may set $X_{max}$ to the maximum offset from the key descriptors. If step 13 of FIG. 1 did not compute the required effective parameters $\eta_{eff}$, $v_{nmo}$, and $V_{nmo}$ for this $t_o$, they may also be computed at step 21 using the calculations explained for step 13 of FIG. 1.

Referring again to FIG. 2, the detectability threshold D is computed at step 23. This threshold may be based on prior knowledge or may be computed based on the signal to noise ratio of the seismic data, which is one of the key descriptors, and the $f_{max}$ computed at step 22. For example, the threshold might be set as $D=(\tau, \tau/2, \tau/3, \text{ or } \tau/4)$ where $\tau=1/f_{max}$, depending on whether the data is very noisy, noisy, normal, or clean, respectively.

In step 24, the $V_{nmoLO}$, $\eta_{effLO}$, $V_{nmoHI}$, and $\eta_{effHI}$ are calculated for this $t_o$. This may be done, for example, by the following process:

calculate a base arrival time $t_{base}$ for each offset between the minimum offset supplied by the key descriptors and the $X_{max}$ from step 22, and calculated from the velocity model;

calculate test arrival times $t_{test}$ for each offset by scanning over a range of effective NMO velocities $V_{nmo}$ (such as a range from $0.7*V_{nmo}-1.2*V_{nmo}$) and a range of effective $\eta_{eff}$ (such as a range from 0.0 to 0.3) and using Eqn. 1 to compute $t_{test}$;

compute the difference between each $t_{test}$ and $t_{base}$ and keep the largest negative and positive differences, $\Delta t^-_{test}$ and $\Delta t^+_{test}$ respectively;

if the total difference between $\Delta t^-_{test}$ and $\Delta t^+_{test}$ is less than the detectability threshold D, the $V_{nmo}$, $\eta_{eff}$ pair associated with that $t_{test}$ is within the uncertainty, as its residual moveout is not detectable;

when all $V_{nmo}$, $\eta_{eff}$ pairs within the uncertainty are identified through the scanning process, find the minimum and maximum $V_{nmo}$ values and call those $V_{nmoLO}$ and $V_{nmoHI}$. The $\eta_{eff}$ values that are paired with those $V_{nmo}$ values will be $\eta_{effLO}$ and $\eta_{effHI}$.

At step 25, the process may move on to the next $t_o$ and repeat steps 22-24. Once the maximum time desired is reached, the process may move on to step 26 where the bounding velocity and eta curves, $(V_{nmoLO}, \eta_{effLO})$ and $(V_{nmoHI}, \eta_{effHI})$ for all $t_o$ are produced to be passed on for further computation in step 15 of FIG. 1.

The method 200 of FIG. 2 described above is one aspect of the present invention and is not meant to be limiting. Other methods of setting a detectability threshold and calculating the bounding velocities and etas fall within the scope of this method.

Figure 7:
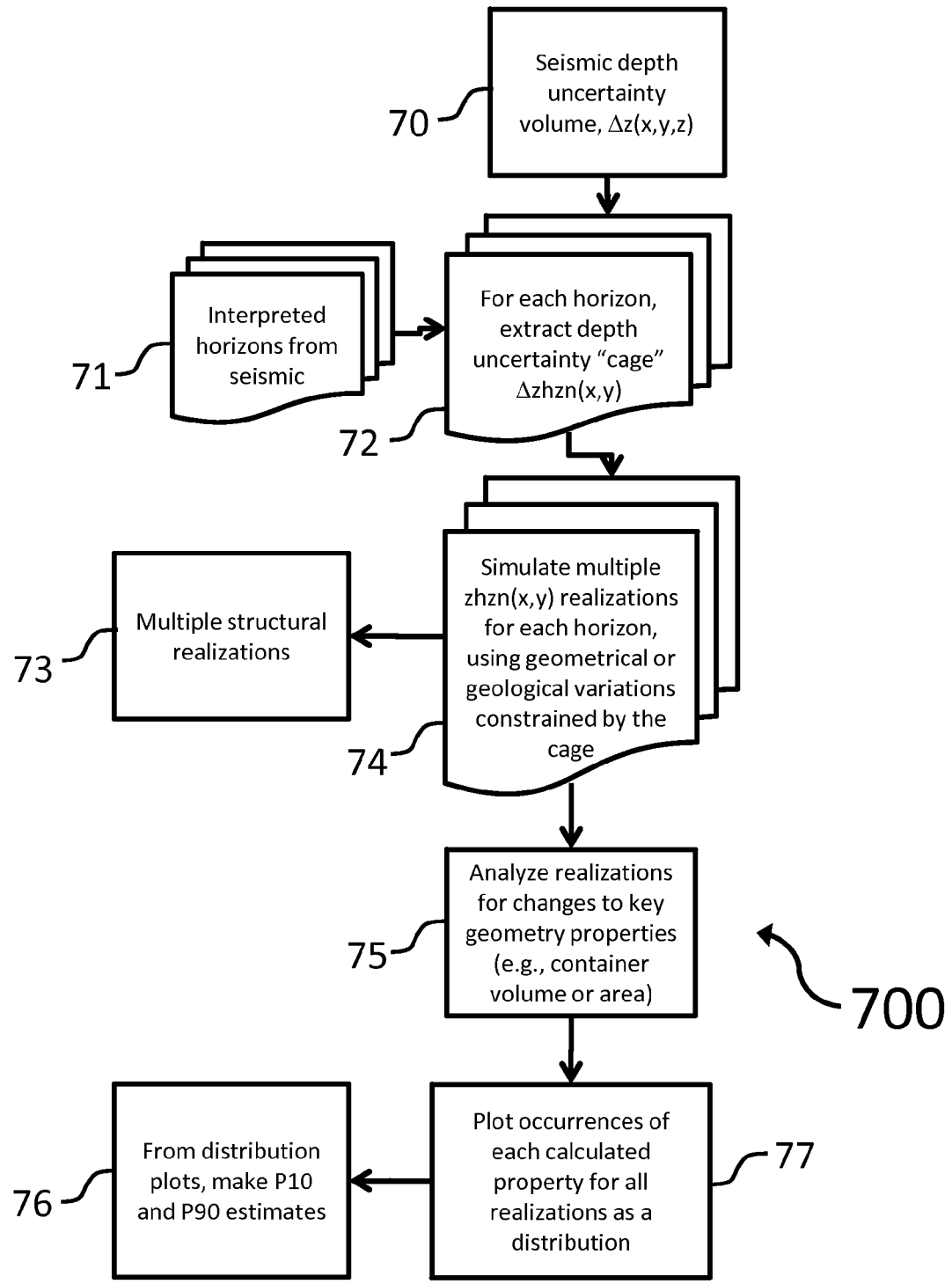
FIG. 7 is a flowchart illustrating a method in accordance with an embodiment of the present invention.

The depth uncertainty volume $\Delta z(x,y,z)$ produced by method 100 of FIG. 1 may be used directly by seismic analysts and interpreters and may also be used to determine structural uncertainty, as explained by the method 700 in FIG. 7. This method uses the depth uncertainty volume and one or more interpreted seismic horizons to produce multiple structural realizations that lay within the depth uncertainty bounds. These multiple realizations can aid in analysis of geometrical and structural properties of the subsurface.

The method 700 receives $\Delta z(x,y,z)$ at step 70 and the interpreted horizons from the seismic data at step 71. At step 72, for each horizon, i, interpreted from the imaged seismic data volume, $Z_{hzni}(x,y)$, on which uncertainty analysis is to be performed, extract the depth uncertainty from $\Delta z(x,y,z)$ at each point on the interpreted surface, giving, $\Delta Z_{hzni}(x,y)$. This quantity may be called the "cage" of uncertainty for this horizon i, since it describes the allowable limits that the horizon may be distorted in depth while safely remaining within the limits of uncertainty.

At step 74, the horizon is distorted in depth in multiple ways to create unique realizations, or realistic versions, of the horizon, each of which differs in its depth structure from the horizon as originally interpreted, but remains confined within the constraints of the depth uncertainty resulting from the above analysis. One skilled in the art will appreciate that the distortion of the horizon may be done in many ways. One method is to start with the uncertainty cage for interpreted horizon $Z_{hzn}(x,y)$, $\Delta Z_{hzn}(x,y)$, where we drop the subscript, i, and understand that we refer to the $i^{th}$ interpreted horizon, and where a corresponding analysis can for done for another interpreted horizon. It is possible to create a Deviation Surface appropriate for this horizon, $D(x,y)$, such that for each location, $(x,y)$, the Deviation Surface is constrained by $|D(x,y)| \leq \Delta Z_{hzn}(x,y)/2$, and where $D(x,y)$ follows the rules listed below. The Deviation Surface is used to create an alternate realization of the horizon surface according to the relation, $R_{hzn}(x,y)=Z_{hzn}(x,y)+D(x,y)$, where R is the alternate realization. The Deviation Surface may be created mathematically, such as to follow a tilted plane, or it may be created using a geologically-driven model, such as by mimicking the structural trend of an overlying stratum. Multiple alternate realizations are obtained by generating alternate versions of $D(x,y)$. Using the subscript, j, we denote the $j^{th}$ realization as $R_{hznj}(x,y)=Z_{hzn}(x,y)+D_j(x,y)$. The manner in which these horizons are distorted to create unique realizations is constrained to follow specific rules. An exemplary set of three rules is listed below. Other rules can be generated to constrain further the allowable set of realizations.

Each realization must portray a depth structure for the horizon which is geologically reasonable. Whether a depth structure is geologically reasonable depends on the depositional environment and subsequent geologic history of the subsurface of which one skilled in the art will be aware. This rule may act as a rejection criterion for a realization from a mathematically-created Deviation Surface. It can also be a construction constraint for a geologically-created Deviation Surface, for example that it mimics the isopach contours of an overlying stratigraphic layer.

Spatial variations in structural features added to create each new realization, e.g., undulations, must not exceed the original interpreted horizon in complexity. This rule can also be stated that the distribution of spectral amplitude over the range of spatial wavenumbers of the horizon spectrum, $A(k_x,k_y)$, should be similar in each realization to the spectrum of the original horizon.

Surface discontinuities cannot be created where not present in the original interpretation, and must be maintained where present in the original interpretation.

Once the set of horizon realizations are created, they can be output at step 73 to a data storage device, a display device, and/or further processing. For example, they may be passed to step 75 for continuing analysis.

Continuing analysis focuses on the variation in some specific geometrical or structural property of the horizon, which may differ according to each realization. For example, when performing hydrocarbon reserve calculations, the container volume within the spill point contour, the column height, and the area of the spill point contour can be calculated for each realization.

Other properties can be calculated for each realization. Each property calculated from the multiple realizations of structural surfaces can be portrayed graphically as a distribution at step 77, from which P10 and P90 estimates of each property can be made at step 76. These P10 and P90 estimates may also be output to a data storage and/or display device.

Figure 8:
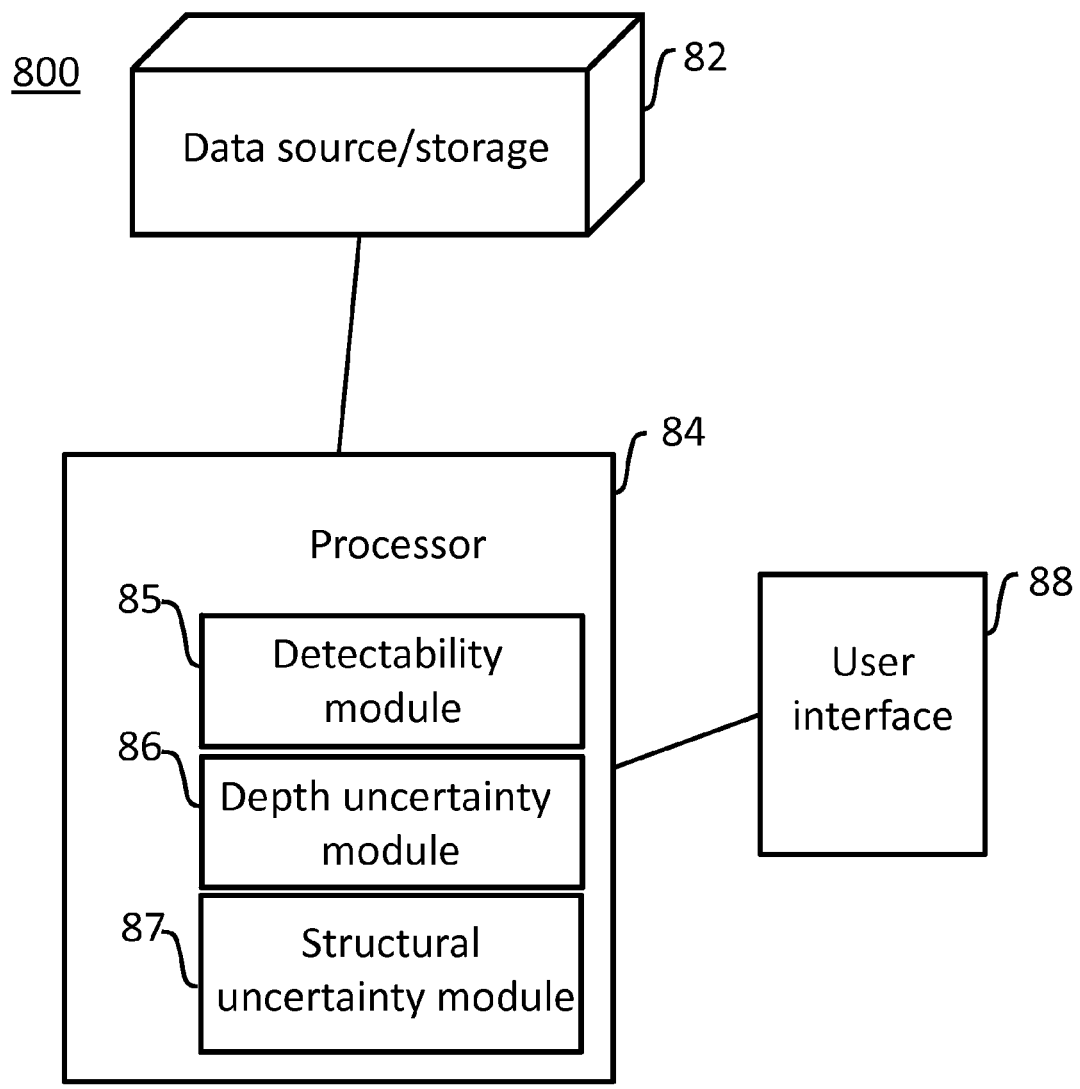
FIG. 8 schematically illustrates a system for performing a method in accordance with an embodiment of the invention.

A system 800 for performing the method is schematically illustrated in FIG. 8. The system includes a data source/storage device 82 which may include, among others, a data storage device or computer memory. The device 82 may contain an anisotropic velocity model, seismic data, parameters relating to the velocity model, parameters relating to the seismic data, and/or a depth uncertainty volume. The data from device 82 may be made available to a processor 84, such as a programmable general purpose computer. The processor 84 is configured to execute a processing module 86 that can perform the depth uncertainty method can interact with the detectability module 85. The processor 84 may also execute the structural uncertainty module 87. The system may include interface components such as user interface 88, and is used to implement the above-described transforms in accordance with embodiments of the invention. The user interface 88 may be used both to display data and processed data products and to allow the user to select among options for implementing aspects of the method. By way of example and not limitation, the depth uncertainty volume and/or multiple structural realizations computed on the processor 84 may be displayed on the user interface 88, stored on the data storage device or memory 82, or both displayed and stored.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method for subsurface characterization from seismic data, the method comprising:
   a. receiving, at a computer processor, effective parameters and properties from an anisotropic seismic velocity model, at least one velocity function, and key descriptors from seismic data;
   b. determining, via a computer processor, a detectability threshold for moveout in a seismic data gather based on the seismic data; and
   c. computing, via a computer processor, a depth uncertainty function based on the detectability threshold, the effective parameters and properties, and the at least one velocity function, wherein the depth uncertainty function represents an error estimate that is used to analyze an interpretation of the seismic data.

2. The method of claim 1, wherein the detectability threshold is determined based on the key descriptors of the seismic data and the effective parameters and properties of the velocity model.

3. The method of claim 2, wherein the key descriptors used comprise a plurality of maximum usable frequencies, a minimum offset, a maximum offset, and an angle mute and the effective parameters and properties used comprise an effective moveout velocity and an effective eta.

4. The method of claim 1, further comprising building a depth uncertainty volume when the at least one velocity function is a plurality of velocity functions.

5. The method of claim 4, further comprising:
   a. receiving the depth uncertainty volume and at least one interpreted horizon from seismic data;
   b. extracting a depth uncertainty cage for each of the at least one interpreted horizons based on the depth uncertainty volume; and
   c. simulating multiple realizations for each of the at least one interpreted horizons, constrained by the depth uncertainty cage, wherein the multiple realizations may be used to analyze an interpretation of the seismic data.

6. The method of claim 5, further comprising analyzing the multiple realizations for changes to geometrical or structural properties of the at least one interpreted horizon.

7. The method of claim 6, further comprising plotting the changes for the multiple realizations to generate at least one distribution.

8. The method of claim 7, further comprising making any of P10, P50 and P90 estimates based on the at least one distribution.

9. A computer-implemented method for subsurface characterization from seismic data, the method comprising:
   a. receiving, at a computer processor, a depth uncertainty volume and at least one interpreted horizon from seismic data;
   b. extracting a depth uncertainty cage for each of the at least one interpreted horizons based on the depth uncertainty volume;
   c. simulating multiple realizations for each of the at least one interpreted horizons, constrained by the depth uncertainty cage; and
   d. analyzing the multiple realizations for changes to geometrical or structural properties of the at least one interpreted horizon.

10. The method of claim 9, further comprising plotting the changes for the multiple realizations as at least one distribution.

11. The method of claim 10, further comprising making any of P10, P50 and P90 estimates based on the at least one distribution.

12. A system for subsurface characterization from seismic data, the system comprising:
   a. a data source containing data representative of the seismic data, effective parameters and properties from an anisotropic velocity and at least one velocity function;
   b. at least one computer processor being configured to communicate with the data source and to execute computer program modules, the computer modules comprising:
      i. a detectability module for computing a detectability threshold; and
      ii. a depth uncertainty module for computing a depth uncertainty function based on the detectability threshold, the effective parameters and properties, and the at least one velocity function, wherein the depth uncertainty function represents an error estimate that is used to analyze an interpretation of the seismic data.

13. The system of claim 12, further comprising a user interface.

14. The system of claim 12, further comprising a structural uncertainty module.

15. A system for subsurface characterization from seismic data, the system comprising:
   a. a data source containing data representative of the seismic data and a depth uncertainty volume; and
   b. at least one computer processor being configured to communicate with the data source and to execute a structural uncertainty module for producing multiple realizations of at least one interpreted horizon in the seismic data based on the depth uncertainty volume and analyzing the multiple realizations for changes to geometrical or structural properties of the at least one interpreted horizon.

16. The system of claim 15, further comprising a user interface.

17. An article of manufacture including a computer readable medium having computer readable code on it, the computer readable code being configured to implement a method for subsurface characterization from seismic data, the method comprising:
   a. determining a detectability threshold for moveout in a seismic data gather; and
   b. computing a depth uncertainty function based on the detectability threshold, effective parameters and properties from an anisotropic velocity model, key descriptors from the seismic data, and at least one velocity function, wherein the depth uncertainty function represents an error estimate that is used to analyze an interpretation in the seismic data.

18. An article of manufacture including a computer readable medium having computer readable code on it, the computer readable code being configured to implement a method for subsurface characterization from seismic data, the method comprising:
   a. extracting a depth uncertainty cage for at least one interpreted horizon from the seismic data based on a depth uncertainty volume; and
   b. simulating multiple realizations for each of the at least one horizons, constrained by the depth uncertainty cage; and
   c. analyzing the multiple realizations for changes to geometrical or structural properties of the at least one interpreted horizon.

* * * * *